US012684090B2

(12) United States Patent
Noguchi

(10) Patent No.: US 12,684,090 B2
(45) Date of Patent: Jul. 14, 2026

(54) CONFERENCE SYSTEM, INFORMATION PROCESSING DEVICE, AND RECORDING MEDIUM

(71) Applicant: HONDA MOTOR CO., LTD., Tokyo (JP)

(72) Inventor: Takashi Noguchi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 184 days.

(21) Appl. No.: 18/582,411

(22) Filed: Feb. 20, 2024

(65) Prior Publication Data

US 2024/0333875 A1 Oct. 3, 2024

(30) Foreign Application Priority Data

Mar. 28, 2023 (JP) ................................. 2023-051554

(51) Int. Cl.
| | |
|---|---|
| *H04N 7/15* | (2006.01) |
| *G10L 15/26* | (2006.01) |
| *H04N 7/14* | (2006.01) |

(52) U.S. Cl.
CPC ............. *H04N 7/155* (2013.01); *G10L 15/26* (2013.01); *H04N 7/147* (2013.01)

(58) Field of Classification Search
None
See application file for complete search history.

(56) References Cited

U.S. PATENT DOCUMENTS

| | | | | |
|---|---|---|---|---|
| 7,251,507 | B2 * | 7/2007 | Kitao | H04M 1/6091 348/E7.079 |
| 10,952,054 | B2 * | 3/2021 | Bajwa | H04W 4/44 |
| 11,315,569 | B1 * | 4/2022 | Talieh | H04L 12/1831 |
| 2017/0061973 | A1 * | 3/2017 | Baier | G11B 27/034 |
| 2020/0286487 | A1 * | 9/2020 | Abdulkader | G10L 15/30 |
| 2023/0046763 | A1 * | 2/2023 | Komeiji | G10L 15/063 |
| 2024/0176960 | A1 * | 5/2024 | Maurer | G06F 16/345 |

FOREIGN PATENT DOCUMENTS

JP 2022-129626 A 9/2022

* cited by examiner

*Primary Examiner* — Quoc D Tran
(74) *Attorney, Agent, or Firm* — Rankin, Hill & Clark LLP

(57) ABSTRACT

Provided is a conference system including: a first conversion unit configured to, during an online conference in which an occupant of a vehicle participates, convert a spoken voice in the online conference into text; a second conversion unit configured to convert the spoken voice into text with higher accuracy compared to the first conversion unit after an end of the online conference; a recording unit configured to record a video of the online conference and record the spoken voice; a playback unit configured to play back the video of the online conference recorded by the recording unit and the spoken voice recorded by the recording unit; and a text display unit configured to display text converted by the first conversion unit or text converted by the second conversion unit, accompanying the playback of the playback unit.

7 Claims, 9 Drawing Sheets

TA3

TA3

CONFERENCE SYSTEM, INFORMATION PROCESSING DEVICE, AND RECORDING MEDIUM

INCORPORATION BY REFERENCE

The present application claims priority under 35 U.S.C. § 119 to Japanese Patent Application No. 2023-051554 filed on Mar. 28, 2023. The content of the application is incorporated herein by reference in its entirety.

BACKGROUND OF THE INVENTION

Field of the Invention

The present invention relates to a conference system, an information processing device, and a recording medium.

Description of the Related Art

In recent years, active efforts have been made to provide access to a sustainable transportation system while taking into consideration even vulnerable people such as the elderly, people with disabilities, and children among traffic participants. To realize this, the focus is on research and development for further improving safety and convenience through development regarding comfortability of a vehicle. A technique for conducting an online conference in a vehicle has been known as a technique related to comfortability of the vehicle (for example, see Japanese Patent Laid-Open No. 2022-129626). Japanese Patent Laid-Open No. 2022-129626 discloses an in-vehicle terminal device that is installed in a vehicle and constitutes an electronic conference system. The in-vehicle terminal device switches output or non-output of the other party's voice from a speaker in the vehicle, and switches transmission or non-transmission of a voice signal in the vehicle to the other party's terminal device, depending on a state of the vehicle.

By the way, during an online conference in which occupants of a vehicle participate, it is assumed that a voice spoken in the online conference is displayed in the form of text in the vehicle. Further, when the online conference is held, since conference participants may miss or mishear what is being said, it is assumed that video recording and voice recording of the online conference are performed.

During playback of the video recording and the voice recording of the online conference, it is considered that text of the voice spoken in the online conference is displayed together, but depending on viewers, there may be a desire to display text converted during the online conference, or there may be a desire to display text, which is converted from the spoken voice, with higher accuracy compared to the conversion during the online conference. Further, depending on watching and listening situations, it may be desirable to display text converted during the online conference, or it may be desirable to display text, which is converted from the spoken voice, with higher accuracy compared to the conversion during the online conference.

The present invention has been made in view of the above-described circumstance, and an object thereof is to, during playback of video recording and voice recording of an online conference, display voice spoken in the online conference with text suitable for viewer's wishes and viewing conditions.

SUMMARY OF THE INVENTION

One aspect of the present invention provides a conference system including: a first conversion unit configured to, during an online conference in which an occupant of a vehicle participates, convert a spoken voice in the online conference into text; a second conversion unit configured to convert the spoken voice into text with higher accuracy compared to the first conversion unit after an end of the online conference; a recording unit configured to record a video of the online conference and record the spoken voice; a playback unit configured to play back the video of the online conference recorded by the recording unit and the spoken voice recorded by the recording unit; and a text display unit configured to display text converted by the first conversion unit or text converted by the second conversion unit, accompanying the playback of the playback unit.

Advantageous Effect of Invention

According to the aspect of the present invention, it is possible to, during the playback of the video recording and the voice recording of the online conference, display the voice spoken in the online conference in the form of text suitable for viewer's wishes and viewing conditions.

DETAILED DESCRIPTION OF THE PREFERRED EMBODIMENTS

1. First Embodiment

[1-1. Configuration of Conference System]

Figure 1:
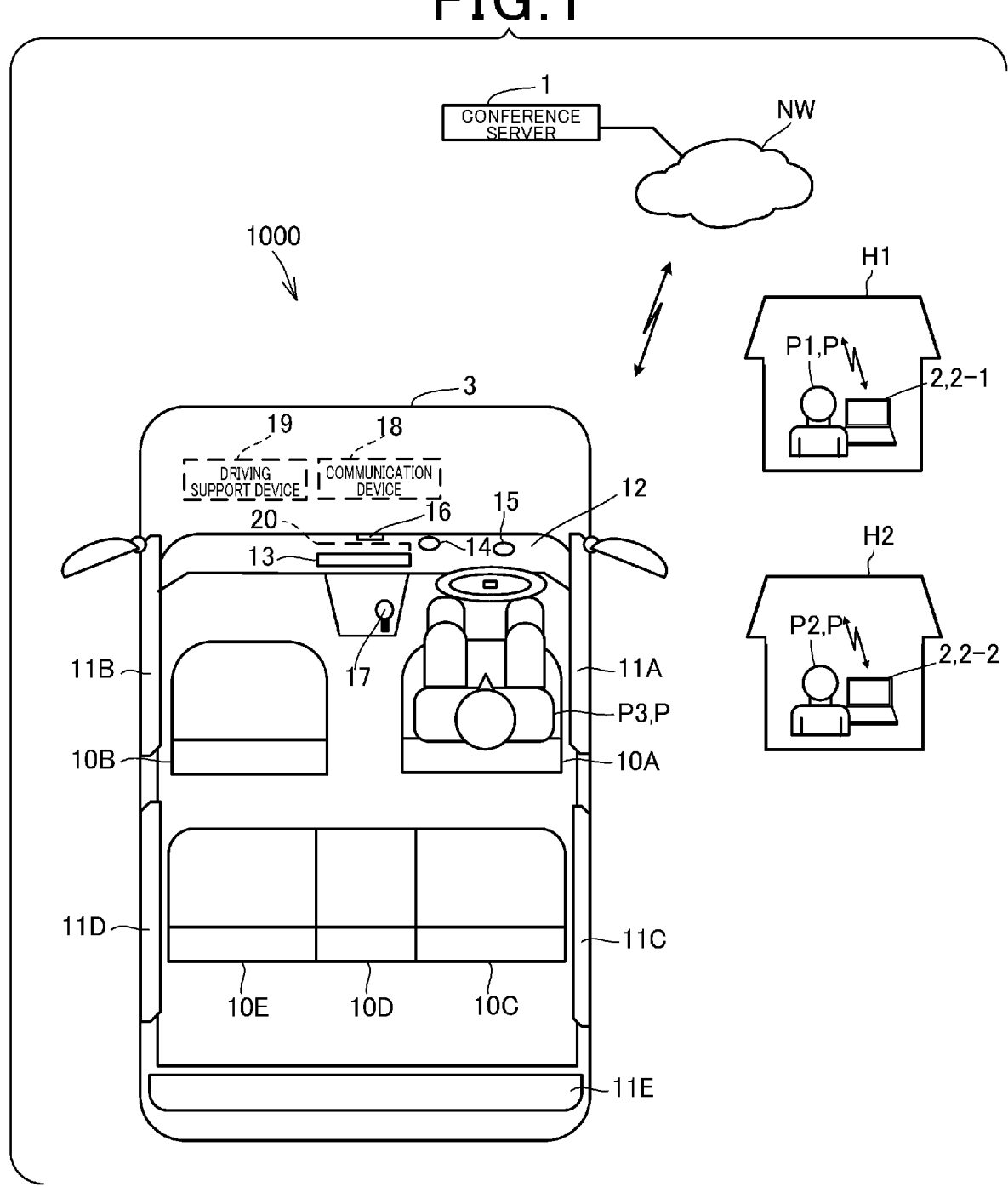
FIG. 1 is a diagram showing a configuration of a conference system.

FIG. 1 is a diagram showing a configuration of a conference system 1000.

The conference system 1000 includes a conference server 1, one or a plurality of terminal devices 2, and one or a plurality of vehicles 3. FIG. 1 illustrates a case where the conference system 1000 includes two terminal devices 2 and one vehicle 3. FIG. 1 illustrates a case where three conference participants P of a terminal user P1, a terminal user P2, and an occupant P3 of the vehicle 3 have an online conference.

The terminal user P1 is participating in an online conference using a terminal device 2-1 at a facility H1. The terminal user P2 is participating in an online conference using a terminal device 2-2 at a facility H2. The occupant P3 is participating in an online conference using a display device 20 in the vehicle 3.

The display device 20 is an example of an "information processing device".

The conference server 1 is a server device that provides an online conference. This online conference is a conference in which the occupant P3 can participate in the vehicle 3. The conference server 1 connects to a network NW, and communicates with the terminal device 2 and the vehicle 3. The network NW is a communication network configured by a public line network, a private line, and other communication circuits.

The terminal device 2 is, for example, a smartphone, a tablet PC (Personal Computer), a laptop PC, a desktop PC, and the like. FIG. 1 illustrates a case where the terminal device 2 is a laptop PC. The terminal device 2 connects to the network NW and communicates with the conference server 1.

An application program is installed into the terminal device 2 to participate in an online conference provided by the conference server 1. During the online conference, the terminal device 2 uses a function of the application program to transmit voice data spoken by the conference participant P to the conference server 1. Upon receiving the voice data from the terminal device 2, the conference server 1 transmits the received voice data to another terminal device 2 used by the conference participant P who is participating in the same online conference as the conference participant P who spoke. Further, upon receiving the voice data from the terminal device 2, the conference server 1 transmits the received voice data to the vehicle 3 on which the occupant P3, who is participating in the same online conference as the conference participant P who spoke, rides. For example, upon receiving voice data from the terminal device 2-1, the conference server 1 transmits the received voice data to the terminal device 2-2 and the vehicle 3. Further, for example, upon receiving voice data from the terminal device 2-2, the conference server 1 transmits the received voice data to the terminal device 2-1 and the vehicle 3.

The terminal device 2 may transmit data of a moving image captured by a camera that is provided or connected thereto, like the voice data. Upon receiving data of the moving image from the terminal device 2, the conference server 1 transmits the received data of the moving image to another terminal device 2 and the vehicle 3, like the voice data.

[1-2. Configuration of Vehicle]

The vehicle 3 illustrated in FIG. 1 is a four-wheel vehicle with a riding capacity of five people. The vehicle 3 includes a driver seat 10A, a passenger seat 10B, a right rear seat 10C, a center rear seat 10D, and a left rear seat 10E. The occupant P3 of the vehicle 3 shown in FIG. 1 is a driver. In the vehicle 3 shown in FIG. 1, the occupant P3 is seated in the driver seat 10A. The vehicle 3 is not limited to a four-wheel vehicle, and may have three or less wheels or five or more wheels. In addition, the riding capacity of the vehicle 3 may be four or less, or six or more.

The vehicle 3 includes a right front door 11A, a left front door 11B, a right rear door 11C, a left rear door 11D, and a tailgate 11E. By opening of the right front door 11A, the left front door 11B, the right rear door 11C, and the left rear door 11D, passengers can enter or exit an interior space of the vehicle 3. The tailgate 11E opens or closes a trunk of the vehicle 3.

The vehicle 3 includes a dashboard 12. The dashboard 12 is installed with a touch panel 13, a speaker 14, and a microphone 15. The touch panel 13 is configured in such a manner that a display panel and a touch sensor are overlapped or integrated, the display panel being configured to display characters and images, a touch sensor being configured to detect contact with the display panel. The speaker 14 outputs a voice to the interior space of the vehicle 3. The microphone 15 collects voices inside the vehicle 3. The installation positions and numbers of the speaker 14 and the microphone 15 can be changed as desired.

Each of the touch panel 13 and the speaker 14 is an example of a "playback instrument". The touch panel 13 is an example of a "display unit".

A camera 16 is installed inside the interior of the vehicle 3 to capture the interior of the vehicle 3. The camera 16 is a so-called driver monitoring camera (DMC), and captures a driver seated in the driver seat 10A. A capturing range of the camera 16 is set to a range including at least the driver's head.

In the interior of the vehicle 3, a shift lever 17 is installed near the driver seat 10A.

The vehicle 3 includes a communication device 18 (transmitter/receiver, circuit) that can communicate with the conference server 1. The communication device 18 is a so-called TCU (Telematics Control Unit), and communicates with the conference server 1.

The vehicle 3 includes a driving support device 19 (computer). The driving support device 19 is a device that executes a driving support function to support driving of the vehicle 3 by the driver. Examples of the driving support function executed by the driving support device 19 may include one or a plurality of functions of a collision damage reducing function, a lane departure preventing (lane keep assist) function, a straight driving support function, a rear side vehicle approach warning (blind spot monitor) function, and the like. The collision damage reducing function is a function of decelerating the vehicle 3 in order to avoid the collision or reduce of the collision damage when there is a possibility of collision with an object ahead in a direction of driving. In order to realize the above functions, the driving support device 19 is connected with a front camera that captures the front of the vehicle 3, a rear camera that captures the rear of the vehicle 3, and a radar unit that detects objects around the vehicle 3.

The vehicle 3 includes a display device 20. The display device 20 includes a touch panel 13, and is configured as a device called display audio (DA) or a car navigation device, for example.

Figure 2:
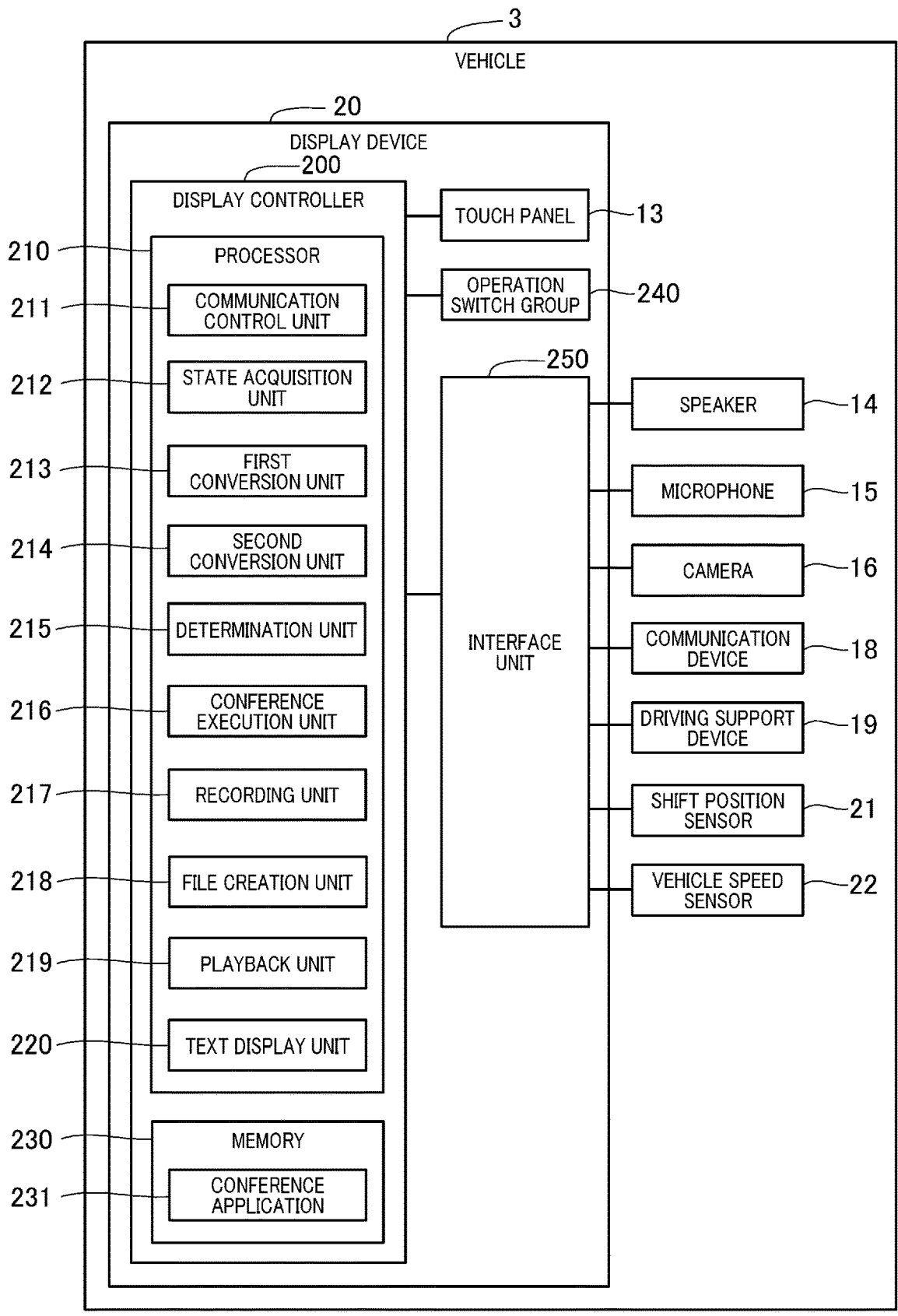
FIG. 2 is a diagram showing a configuration of a vehicle.

FIG. 2 is a diagram showing the configuration of the vehicle 3.

The vehicle 3 includes a display device 20, a speaker 14, a microphone 15, a camera 16, a communication device 18, a driving support device 19, a shift position sensor 21, and a vehicle speed sensor 22. The display device 20 is connected with the speaker 14, the microphone 15, the camera 16, the communication device 18, the driving support device 19, the shift position sensor 21, and the vehicle speed sensor 22. The devices connected to the display device 20 are not limited to these devices, and other devices may be connected.

The speaker 14 outputs various voices according to control of the display device 20.

The microphone 15 collects voices according to control of the display device 20.

The camera 16 outputs image data of the captured image to the display device 20.

The communication device 18 communicates with the conference server 1 according to control of the display device 20.

When the execution of the driving support function of the vehicle 3 is turned on, the driving support device 19 outputs information indicating that the execution of the driving support function of the vehicle 3 is turned on to the display device 20. Further, when the execution of the driving support function of the vehicle 3 is not turned on, the driving support device 19 outputs information indicating that the execution of the driving support function of the vehicle 3 is not turned on to the display device 20.

The shift position sensor 21 detects shift positions of the shift lever 17 provided in the vehicle 3. The shift positions include, for example, P (parking) used during parking or stopping, R (reverse) used during reversing, N (neutral), and D (drive) used during driving. The shift position sensor 21 outputs a detection signal indicating the detected shift position to the display device 20.

The vehicle speed sensor 22 detects a speed of the vehicle 3. The vehicle speed sensor 22 detects a speed of the vehicle 3 at a predetermined period, and outputs a detection signal indicating the speed of the vehicle 3 detected every detection to the display device 20.

The display device 20 is a device to be provided in the vehicle 3, and includes a display controller 200, a touch panel 13, an operation switch group 240, and an interface unit 250.

The display controller 200 incudes a processor 210 such as a CPU (Central Processing Unit) or an MPU (Micro Processor Unit), a memory 230, and an interface circuit configured to connect other devices and sensors, and controls each of the units of the display device 20.

The memory 230 is a storage device that stores programs and data. The memory 230 stores data processed by a conference application 231 and the processor 210. The memory 230 has a nonvolatile storage region. Further, the memory 230 may have a volatile region and constitute a work area of the processor 210. The memory 230 is configured by a ROM (Read Only Memory) or a RAM (Random Access Memory), for example.

The conference application 231 is an example of a "program".

The conference application 231 is an application program for using an online conference provided by the conference server 1.

The touch panel 13 displays various kinds of information according to control of the display controller 200. The touch panel 13 outputs a detection signal of a touch sensor to the display controller 200.

The operation switch group 240 includes various operation switches for operating the display controller 200. Each of the operation switches in the operation switch group 240 outputs an operation signal to the display controller 200 when being operated.

The interface unit 250 includes hardware such as a connector and a communication circuit, and communicates with various devices that communicatively connected to the display device 20. In the present embodiment, the interface unit 250 is communicatively connected to the speaker 14, the microphone 15, the camera 16, the communication device 18, the shift position sensor 21, and the vehicle speed sensor 22.

The processor 210 reads and executes the conference application 231 stored in the memory 230, and thus functions as a communication control unit 211, a state acquisition unit 212, a first conversion unit 213, a second conversion unit 214, a determination unit 215, a conference execution unit 216, a recording unit 217, a file creation unit 218, a playback unit 219, and text display unit 220.

The communication control unit 211 communicates with the conference server 1 via the communication device 18.

The communication control unit 211 receives voice data from the terminal device 2 via the conference server 1. When the terminal device 2 transmits data of a moving image, the communication control unit 211 receives the data of the moving image from the terminal device 2 via the conference server 1.

Further, the communication control unit 211 transmits the voice data of the sound, which is collected by the microphone 15, to the conference server 1. Upon receiving the voice data from the vehicle 3, the conference server 1 transmits the voice data to the terminal device 2 used by the conference participant P who participates in the online conference in which the occupant P3 participates.

The communication control unit 211 may transmit data of a moving image captured by the camera 16, like the voice data. Upon receiving the data of the moving image from the vehicle 3, the conference server 1 transmits the received data of the moving image to the terminal device 2, like the voice data.

The state acquisition unit 212 acquires a state of the vehicle 3. The state acquisition unit 212 acquires a speed of the vehicle 3 as a state of the vehicle 3. The state acquisition unit 212 acquires the speed of the vehicle 3 by receiving the detection signal from the vehicle speed sensor 22.

The first conversion unit 213 converts the voice indicated by the voice data received by the communication control unit 211 and the voice collected by the microphone 15 into text. Such a voice is a voice spoken in the online conference. The first conversion unit 213 converts the voice indicated by the voice data received by the communication control unit 211 and the voice collected by the microphone 15 into text by voice recognition. The first conversion unit 213 converts voice into text in predetermined units. Examples of the predetermined unit may include each character, each word, and each clause. For example, when the voice is "Today, it is hot", the first conversion unit 213 converts the voice "Today" into text, and then converts the voice "It is hot" into text. The first conversion unit 213 outputs information indicating the converted text to the conference execution unit 216 whenever conversion is performed. Further, the first conversion unit 213 outputs information indicating text to the file creation unit 218 while the recording unit 217 (to be described) executes video recording and voice recording.

The second conversion unit 214 converts voice into text with higher accuracy compared to the first conversion unit 213. Converting voice into text with high accuracy refers to conversion in which a matching rate between the content of voice and the content of text is high.

For example, the second conversion unit 214 uses a pronunciation dictionary with a larger number of registered words than a pronunciation dictionary used during the voice recognition by the first conversion unit 213, thereby converting voice into text with higher accuracy compared to the first conversion unit 213.

Further, for example, the second conversion unit 214 uses a language model with higher accuracy than a language model used during the voice recognition by the first conversion unit 213, thereby converting voice into text with higher accuracy compared to the first conversion unit 213. The language model is a model used to analysis relationship between words. For Example, while the language model used by the first conversion unit 213 is an N-gram model, the second conversion unit 214 uses an RNN language model based on an RNN (recurrent neural network).

The memory 230 stores various data such as a pronunciation dictionary used for voice recognition by the first conversion unit 213 and the second conversion unit 214.

The determination unit 215 determines whether the execution of the driving support function of the vehicle 3 is turned on or off. When the display device 20 receives, from the driving support device 19, information indicating that the execution of the driving support function is turned on, the determination unit 215 determines that the execution of the driving support function of the vehicle 3 is turned on. On the other hand, when the display device 20 receives, from the driving support device 19, information indicating that the execution of the driving support function is turned off, the determination unit 215 determines that the execution of the driving support function of the vehicle 3 is turned off.

The conference execution unit 216 outputs, through the speaker 14, the voice indicated by the voice data received by the communication control unit 211. Further, the conference execution unit 216 allows the touch panel 13 to display a conference screen KG.

Figure 3:
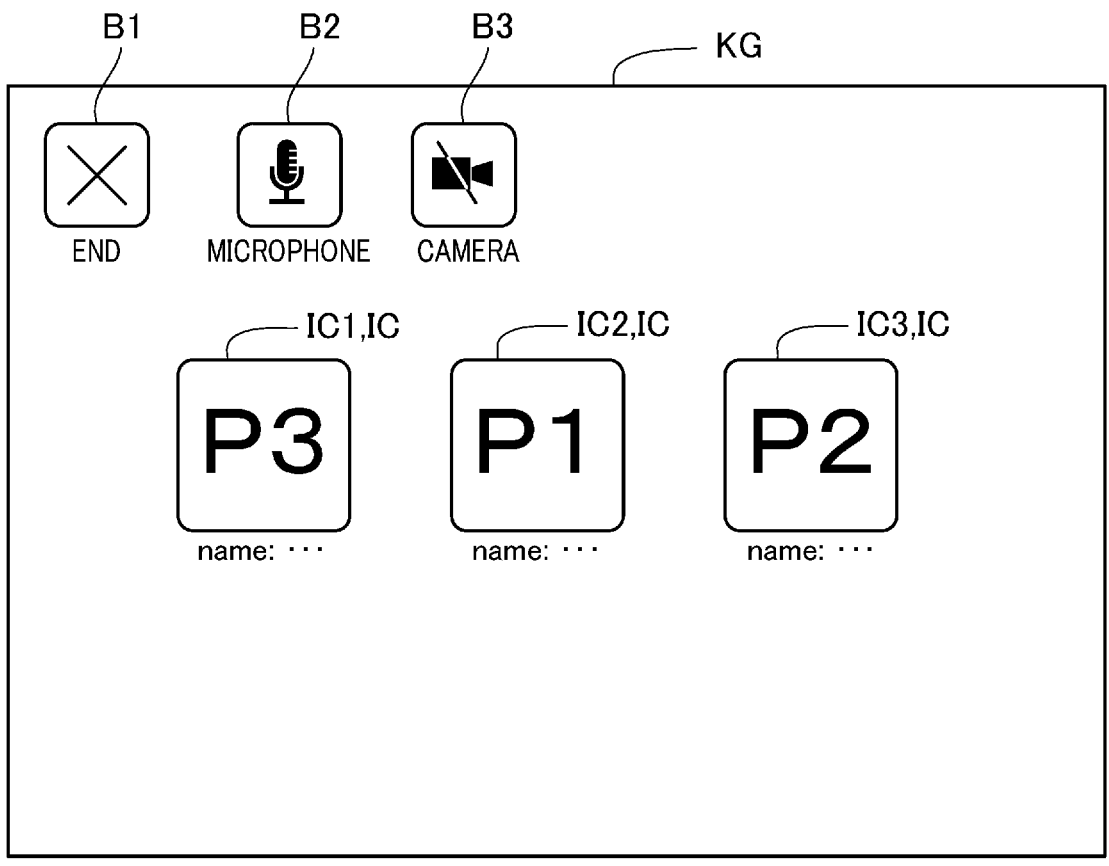
FIG. 3 is a diagram showing an example of a conference screen.

FIG. 3 is a diagram showing an example of a conference screen KG. The conference screen KG shown in FIG. 3 is a screen during an online conference.

The conference screen KG displays icons ICs indicating conference participants P for each conference participant P. The conference screen KG shown in FIG. 3 displays an icon IC1 for an occupant P3, an icon IC2 for a terminal user P1, and an icon IC3 for a terminal user P2.

In addition, the conference screen KG displays a conference end button B1, a microphone button B2, and a camera button B3.

The conference end button B1 is a software button for requesting the end of the online conference (exit from the online conference).

The microphone button B2 is a software button for instructing the microphone 15 to switch between on (un-mute) and off (mute).

The camera button B3 is a software button for instructing the camera 16 to switch between on and off.

The arrangement mode of the icons ICs, shapes of the icons ICs, sizes of the icons ICs, the number of software buttons, and the kind of software buttons on the conference screen KG are not limited to the conference screen KG shown in FIG. 3.

The conference execution unit 216 displays text converted by the first conversion unit 213 within the conference screen KG during the online conference. More specifically, the conference execution unit 216 displays text indicated by the information received from the first conversion unit 213 within the conference screen KG.

Figure 4:
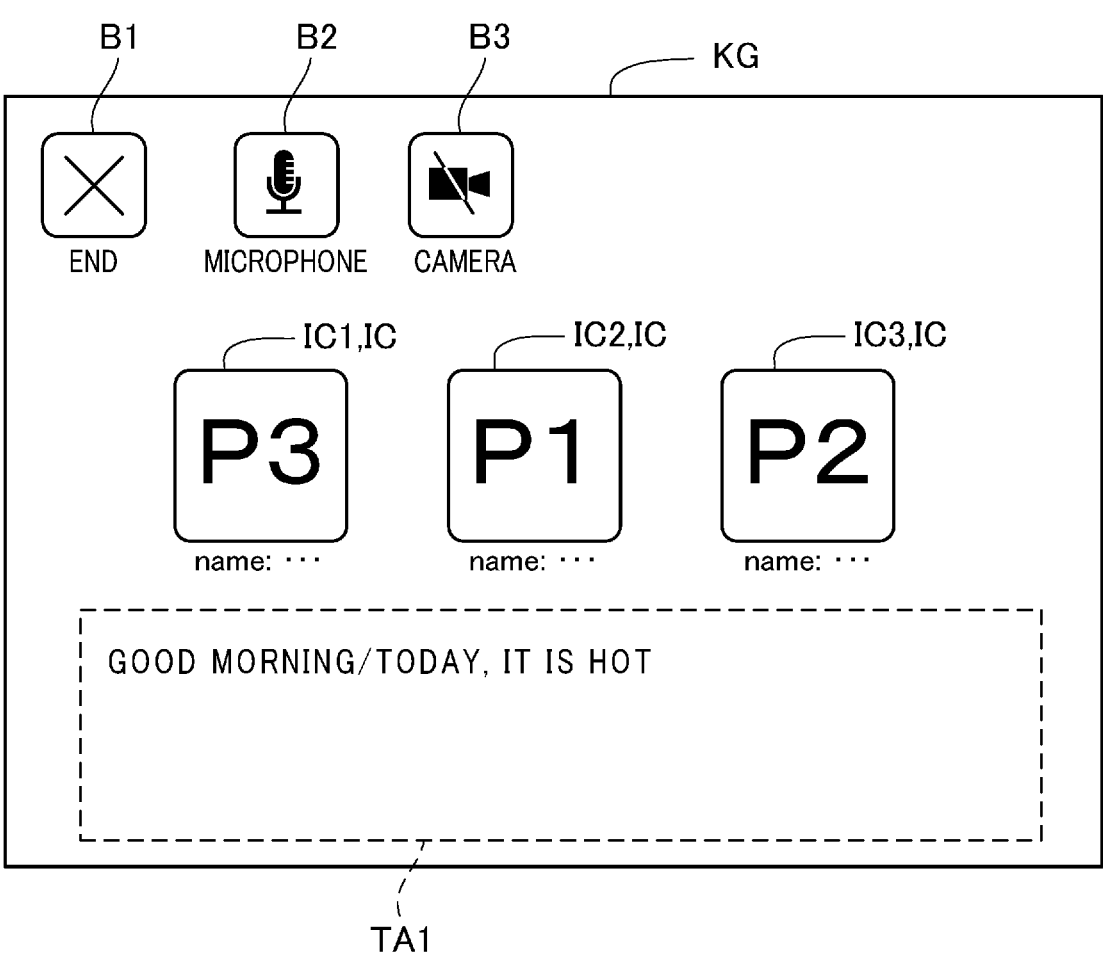
FIG. 4 is a diagram showing an example of a conference screen.

FIG. 4 is a diagram showing an example of a conference screen KG. The conference screen KG shown in FIG. 4 displays text converted by the first conversion unit 213.

When displaying text, the conference execution unit 216 provides a first text display area TA1 within the conference screen KG and displays text in the first text display area TA1. The first text display area TA1 is an area, in which text converted by the first conversion unit 213 is displayed, during the online conference. The first text display area TA1 shown in FIG. 4 displays text "Good morning", text "Today", and text "It is hot" in a line.

Since the second conversion unit 214 converts voice into text with higher accuracy compared to the first conversion unit 213, it takes longer to convert compared to the first conversion unit 213. It is desired to display quickly text in response to the speaking during the online conference. Therefore, during the online conference, text converted by the first conversion unit 213 is displayed.

The recording unit 217 records video of the online conference, and records voice spoken in the online conference. The recording unit 217 records, as video of the online conference, the display content of the conference screen KG when the first text display area TA1 is not provided. The recording unit 217 starts video recording and voice recording for the online conference that is being held when there is an instruction to record video and voice during the online conference. The recording unit 217 ends video recording and voice recording when there is an instruction to end video recording and voice recording during the online conference or when the online conference ends. When ending the video recording and the voice recording, the recording unit 217 stores a file generated by the video recording and the voice recording in the memory 230. Hereinafter, such a file is referred to as a "video and voice recording file".

The file creation unit 218 creates a first composite file and a second composite file.

Hereinafter, the first composite file and the second composite file are referred to as "composite file" when being not distinguished.

The first composite file is a file including a video and voice recording file and a first text display file. The first text display file is a file for displaying text converted by the first conversion unit 213. The first text display file records information about which text to display at which timing with respect to the video indicated by the video and voice recording file.

Whenever the conference execution unit 216 displays text, the file creation unit 218 records, in the first text display file, a combination of information indicating text received from the first conversion unit 213 and an elapsed time from the start of the video recording and the voice recording. The elapsed time recorded in the first text display file is information about a timing to display text. When the online conference ends, the file creation unit 218 creates the first composite file including the video and voice recording file recorded in the memory 230 and the first text display file.

The second composite file is a file including a video and voice recording file and a second text display file. The second text display file is a file for displaying text converted by the second conversion unit 214. The second text display file records information about which text of texts converted by the second conversion unit 214 to display at which timing with respect to the video indicated by the video and voice recording file.

When the online conference ends, the file creation unit 218 causes the second conversion unit 214 to convert the voice recorded in the video and voice recording file stored in the memory 230 into text. Next, the file creation unit 218 divides text converted by the second conversion unit 214 into predetermined units. The predetermined unit is set to a unit that has more characters than the unit in which the first conversion unit 213 converts into text, and for example, is a predetermined number of sentences. For example, when the second conversion unit 214 converts a voice "Today, it is hot/Yes, it is hot/Well, let's start the conference" into text, the file creation unit 218 divides text into text "It is hot today/Yes, it is hot" and text "Well, let's start the conference". The file creation unit 218 records, for each divided text, a combination of the divided text and a playback elapsed time during which a spoken voice indicated by the divided text is played back, in the second text display file. The playback elapsed time is an elapsed time from the start of the playback of the video and voice recording file. The playback elapsed time recorded in the second text display file is information on timing at which the divided text is displayed. After creating the second text display file, the file creation unit 218 creates a second composite file including the video and voice recording file stored in the memory 230 and the second text display file which is generated.

The playback unit 219 plays back the video recorded in the video and voice recording file included in the composite file using the touch panel 13. Further, the playback unit 219 plays back the voice recorded in the video and voice recording file included in the composite file using the speaker 14.

When the playback unit 219 performs playback based on the video and voice recording file included in the first composite file, the text display unit 220 displays text using the touch panel 13 based on the first text display file included in the first composite file, as well as the playback of the playback unit 219. As described above, the first text display file records information about which text to display at which timing with respect to the video indicated by the video and voice recording file. For this reason, the text display unit 220 can display appropriate text at appropriate timing as the playback of the playback unit 219 progresses.

Figure 5:
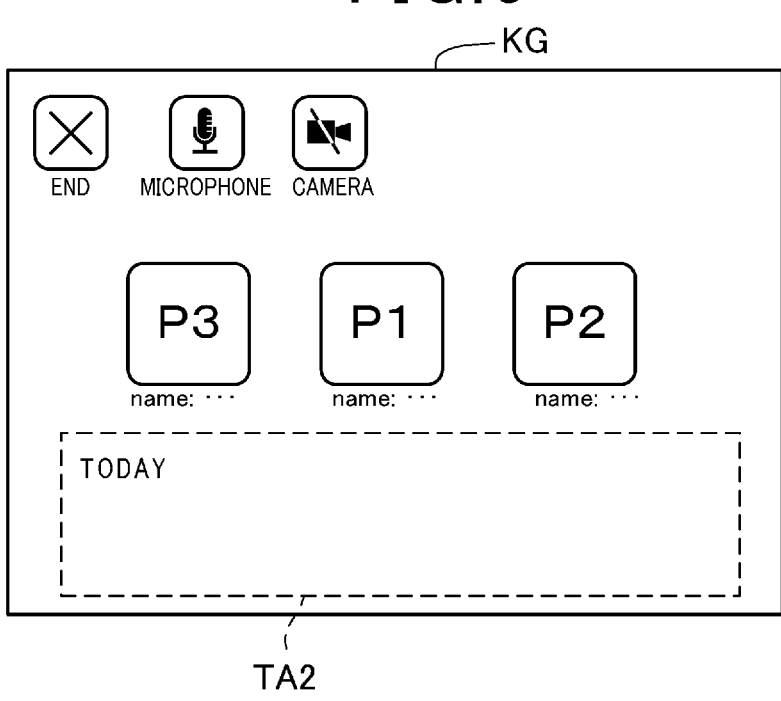
FIG. 5 is a diagram showing an example of text display based on a first text display file.
Figure 5:
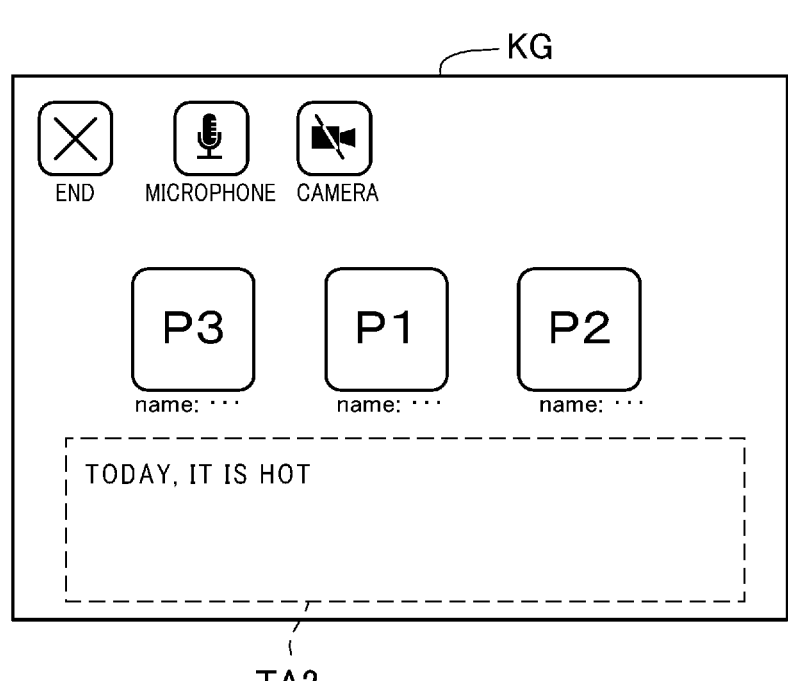

FIG. 5 is a diagram showing an example of text display based on the first text display file.

As shown in FIG. 5, the text display unit 220 provides a second text display area TA2 for the video that the playback unit 219 plays back. The second text display area TA2 is an area in which text recorded in the first text display file is displayed, and is provided for the conference screen KG reflected in the video played back by the playback unit 219.

For example, it is assumed that one conference participant P speaks "It is hot today" and the playback unit 219 plays back the spoken voice. In this case, as shown in FIG. 5, in the second text display area TA2, the text display unit 220 displays text "Today" together with playback of voice "Today", and displays a text "It is hot" together with playback of voice "It is hot".

When the playback unit 219 performs playback based on the video and voice recording file included in the second composite file, the text display unit 220 displays text using the touch panel 13 based on the second text display file included in the second composite file, as well as the playback of the playback unit 219. The second text display file records information about which text of texts converted by the second conversion unit 214 to display at which timing with respect to the video indicated by the video and voice recording file. For this reason, the text display unit 220 can display appropriately divided text at appropriate timing as the playback of the playback unit 219 progresses.

Figure 6:
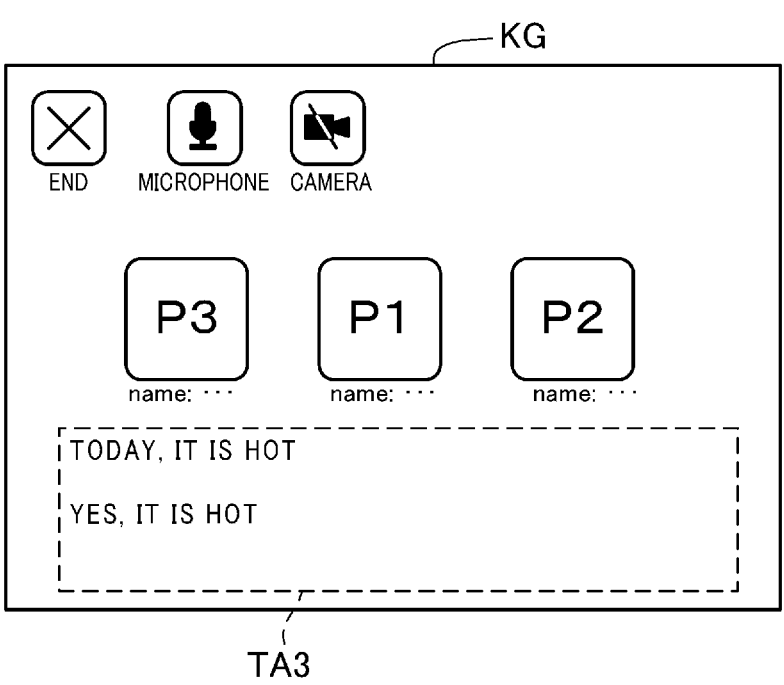
FIG. 6 is a diagram showing an example of text display based on a second text display file.
Figure 6:
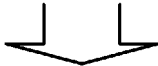
Figure 6:
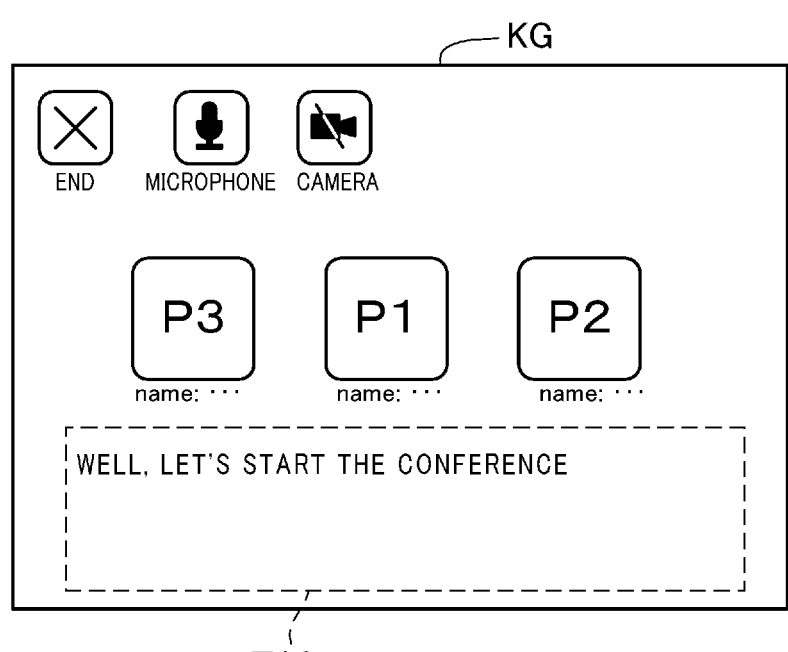

FIG. 6 is a diagram showing an example of text display based on the second text display file.

As shown in FIG. 6, the text display unit 220 provides a third text display area TA3 for the video that the playback unit 219 plays back. The third text display area TA3 is an area in which text recorded in the second text display file is displayed, and is provided for the conference screen KG reflected in the video played back by the playback unit 219.

For example, it is assumed that there is a voice spoken in the online conference such as "Today, it is hot/Yes, it is hot/Let's start the conference" and text converted by the second conversion unit 214 is divided into text "It is hot today/Yes, it is hot" and text "Well, let's start the conference" in the second text display file. In this case, as shown in FIG. 6, in the third text display area TA3, the text display unit 220 displays text "Today, it is hot/Yes, it is hot" together with playback of voice "Today, it is hot/Yes, it is hot". Then, in the third text display area TA3, the text display unit 220 does not display text "It is hot today/Yes, it is hot" and displays text "Well, let's start the conference" together with playback of voice "Well, let's start the conference".

[1-3. Operation of Display Device]

An operation of the display device 20 will be described below.

Figure 7:
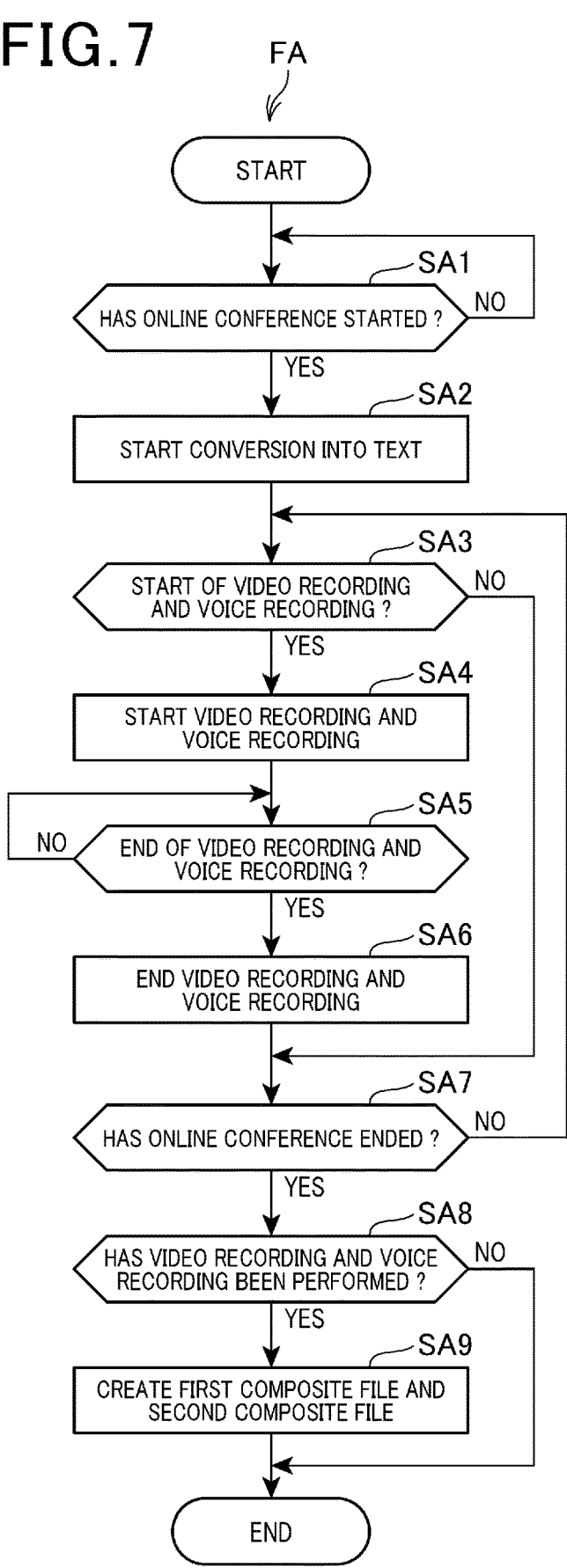
FIG. 7 is a flowchart showing an operation of a display device.

FIG. 7 is a flowchart FA showing an operation of the display device 20.

FIG. 7 shows an operation until the file creation unit 218 creates the first composite file and the second composite file.

As shown in the flowchart FA, the conference execution unit 216 determines whether the online conference has started (step SA1). For example, the conference screen KG is provided with a participation button for applying to participate in the online conference, and when the participation button is operated, the conference execution unit 216 makes an affirmative determination in step SA1.

When the conference execution unit 216 determines that the online conference has not started (step SA1: NO), it performs the determination in step SA1 again.

On the other hand, when the conference execution unit 216 determines that the online conference has started (step SA1: YES), the first conversion unit 213 starts converting voice spoken in the online conference into text (step SA2).

Next, the recording unit 217 determines whether to start recording video of the online conference and voice of the online conference (step SA3). For example, the conference screen KG is provided with a start button for starting video recording and voice recording, and when the start button is operated, the recording unit 217 makes an affirmative determination in step SA3.

When the recording unit 217 determines not to start recording the video of the online conference and the voice of the online conference (step SA3: NO), the process proceeds to step SA7.

When the recording unit 217 determines to start recording the video of the online conference and the voice of the online conference (step SA3: YES), it starts recording the video of the online conference and the voice of the online conference (step SA4).

Next, the recording unit 217 determines whether to end recording of the video of the online conference and the voice of the online conference (step SA5). For example, the conference screen KG is provided with an end button for starting video recording and voice recording, and when the end button is operated, the recording unit 217 makes an affirmative determination in step SA3. Further, for example, the conference screen KG is provided with an exit button for exiting the online conference, and when the exit button is operated, the recording unit 217 makes an affirmative determination in step SA3.

When the recording unit 217 determines not to end the recording of the video of the online conference and the voice of the online conference (step SA5: NO), it performs the determination of step SA5 again.

On the other hand, when the recording unit 217 determines to end the recording of the video of the online conference and the voice of the online conference (step SA5: YES), it ends the recording of the video of the online conference and the voice of the online conference (step SA6).

Next, the conference execution unit 216 determines whether the online conference has ended (step SA7). When the conference execution unit 216 determines that the online conference has not ended (step SA7: NO), the process proceeds to step SA3.

On the other hand, when the conference execution unit 216 determines that the online conference has ended (step SA7: YES), the file creation unit 218 determines whether the video and voice of the online conference have been recorded (step SA8).

When the file creation unit 218 determines that the video and voice of the online conference have been recorded (step SA8: YES), it creates a first composite file and a second composite file (step SA9).

The first composite file and the second composite file created in step SA9 may be stored in the memory 230, or may be uploaded to the conference server 1.

Next, an operation of the display device 20 related to the playback of the playback unit 219 will be described.

Figure 8:
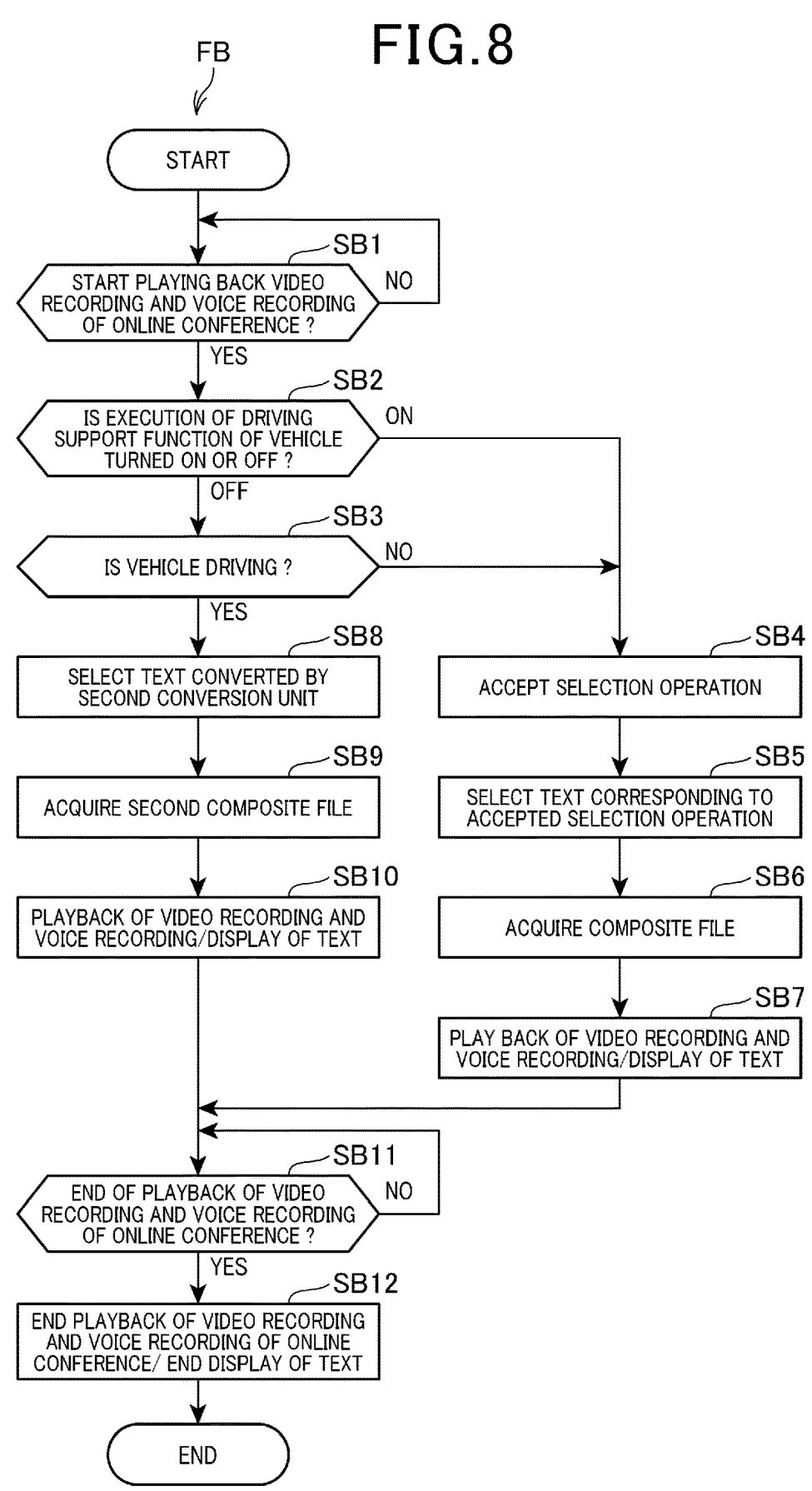
FIG. 8 is a flowchart showing an operation of a display device.

FIG. 8 is a flowchart FB showing an operation of the display device 20.

The playback unit 219 determines whether to start playing back the video recording and the voice recording of the online conference (step SB1). For example, when there is an instruction to start playing back the video recording and the voice recording via the touch panel 13 or the operation switch group 240, the playback unit 219 makes an affirmative determination in step SB1.

When the playback unit 219 determines to start playing back the video recording and the voice recording of the online conference (step SB1: YES), the determination unit 215 determines whether the execution of the driving support function of the vehicle 3 is turned on or off (step SB2).

When the determination unit 215 determines that the execution of the driving support function is turned off (step SB2: off), the text display unit 220 determines, based on the speed of the vehicle 3 acquired by the state acquisition unit 212, whether the vehicle 3 is driving (step SB3). In step SB3, the text display unit 220 determines that the vehicle 3 is driving when the speed of the vehicle 3 acquired by the state acquisition unit 212 is greater than 0 km/h.

When the text display unit 220 determines that the vehicle 3 is not driving (step SB3: NO), it accepts a selection operation as to whether text to be displayed accompanying the playback of the playback unit 219 is text converted by the first conversion unit 213 or text converted by the second conversion unit 214 (step SB4).

Next, text display unit 220 selects text corresponding to the selection operation accepted in step SB4 as text to be displayed accompanying the playback of the playback unit 219 (step SB5).

Next, the playback unit 219 or the text display unit 220 acquires a composite file for displaying text selected in step SB5 from the memory 230 or the conference server 1 (step SB6).

In step SB6, the playback unit 219 or the text display unit 220 acquires the first composite file from the memory 230 or the conference server 1 when text selected in step SB5 is text converted by the first conversion unit 213. Further, in step SB6, the playback unit 219 or the text display unit 220 acquires the second composite file from the memory 230 or the conference server 1 when text selected in step SB5 is text converted by the second conversion unit 214.

Next, the playback unit 219 plays back the video recording and the voice recording of the online conference based on the video and voice recording file included in the composite file acquired in step SB6 (step SB7). Further, the text display unit 220 displays text spoken in the online conference based on the text display file included in the composite file acquired in step SB6 (step SB7).

Returning to the description of step SB3, when the text display unit 220 determines that the vehicle 3 is driving (step SB3: YES), it selects, as text to be displayed accompanying the playback of the playback unit 219, text converted by the second conversion unit 214 (step SB8).

Next, the playback unit 219 or the text display unit 220 acquires the second composite file from the memory 230 or the conference server 1 (step SB9).

Next, the playback unit 219 plays back the video recording and the voice recording of the online conference, based on the video and voice recording file included in the second composite file acquired in step SB9 (step SB10). Further, the text display unit 220 displays text spoken in the online conference, based on the second text display file included in the second composite file acquired in step SB9 (step SB10).

The playback unit 219 determines whether to end the playback of the video recording and the voice recording of the online conference (step SB11). For example, when there is an instruction to start ending the video recording and the voice recording via the touch panel 13 or the operation switch group 240 or when the playback of the video recording and the voice recording ends, the playback unit 219 makes an affirmative determination in step SB11.

When the playback unit 219 determines to end the playback of the video recording and the voice recording of the online conference (step SB11: YES), it ends the playback of the video recording and the voice recording of the online conference (step SB12). Further, the text display unit 220 ends the display of text accompanying the playback of the playback unit 219 (step SB12).

2. Second Embodiment

Next, a second embodiment will be described.

In the description of the second embodiment, the same components as those of each unit of the conference system 1000 according to the first embodiment are denoted by the same reference numerals, and detailed description thereof will not be given as appropriate.

Comparing the second embodiment with the first embodiment, the file creation unit 218 of the second embodiment does not create the first composite file and the second composite file, but creates the first text display file and the second text display file. In the second embodiment, the text display file and the video and voice recording file created by the file creation unit 218 are stored in the memory 230, or the text display file and the video and voice recording file created by the file creation unit 218 are uploaded to the conference server 1.

Comparing the second embodiment with the first embodiment, the second embodiment is different from the first embodiment in terms of the operation of the display device 20.

Figure 9:
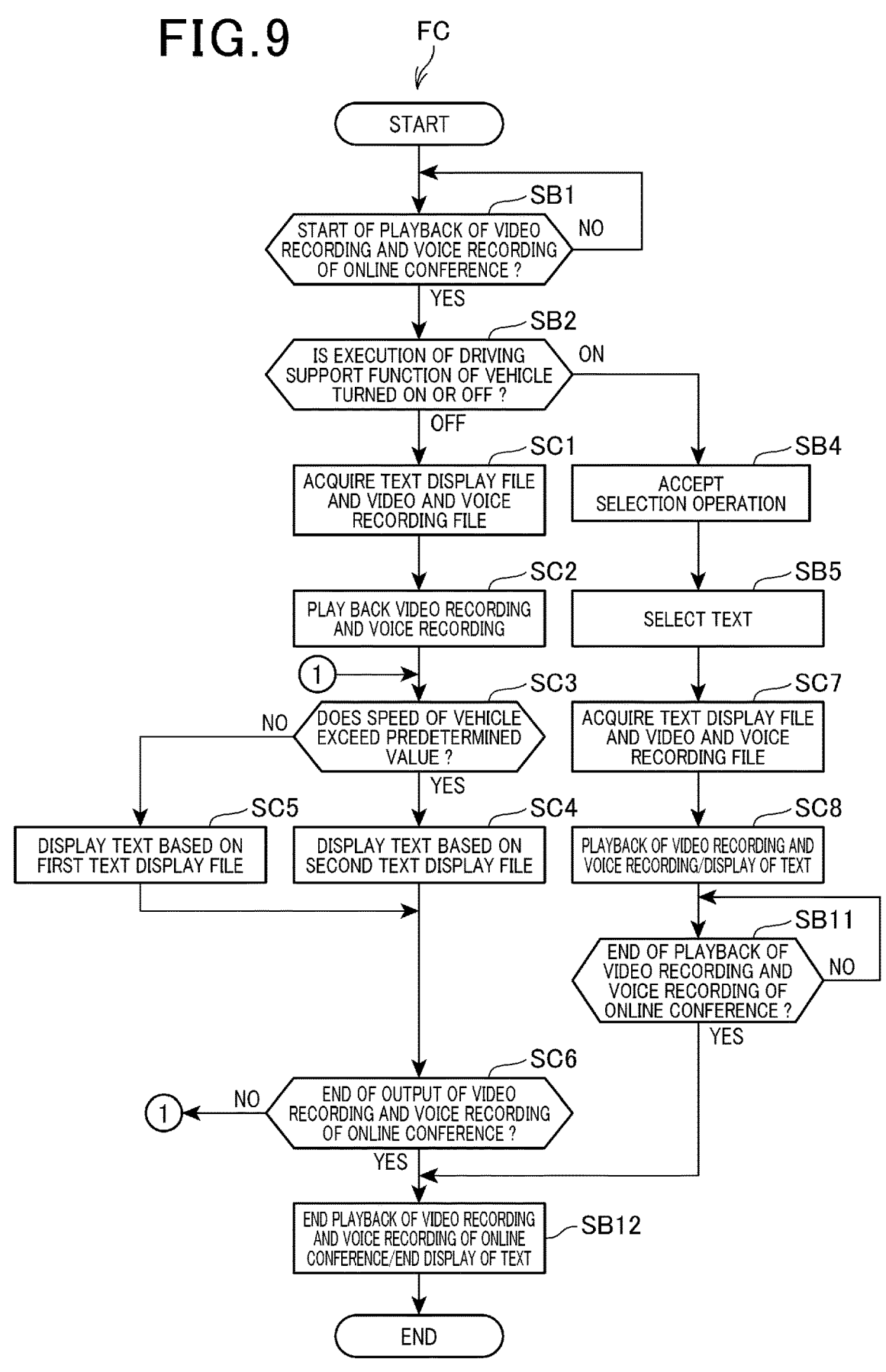
FIG. 9 is a flowchart showing an operation of a display device.

FIG. 9 is a flowchart FC showing an operation of the display device 20 according to the second embodiment.

In the description of the flowchart FC, the same steps as those in the flowchart FB are denoted by the same step numbers, and detailed description thereof will not be given as appropriate.

As shown in the flowchart FC, when the determination unit 215 determines that the execution of the driving support function is turned off (step SB2: off), the playback unit 219 or the text display unit 220 acquires the text display file and the video and voice recording file from the memory 230 or the conference server 1 (step SC1).

Next, the playback unit 219 plays back the video recording and the voice recording of the online conference based on the video and voice recording file acquired in step SC1 (step SC2).

Next, the text display unit 220 determines whether the speed of the vehicle 3 acquired by the state acquisition unit 212 exceeds a predetermined value (step SC3). An example of the predetermined value may include 10 km/h.

When the text display unit 220 determines that the speed of the vehicle 3 exceeds the predetermined value (step SC1: YES), it displays text based on the second text display file acquired in step SC1 as the playback of the playback unit 219 is performed (step SC4).

On the other hand, when the text display unit 220 determines that the speed of the vehicle 3 is the predetermined value or smaller (step SC1: NO), it displays text based on the first text display file acquired in step SC1 as the playback of the playback unit 219 is performed (step SC5).

Next, the playback unit 219 determines whether to end the playback of the video recording and the voice recording of the online conference (step SC6). When the playback unit 219 determines not to end the playback of the video recording and the voice recording of the online conference (step SC6: NO), the process proceeds to step SC3 again, and next processes including step SC3 are performed again.

On the other hand, when the playback unit 219 determines to end the playback of the video recording and the voice recording of the online conference (step SC6: YES), it ends the playback of the video recording and the voice recording of the online conference (step SB12). Further, the text display unit 220 ends the display of text accompanying the playback of the playback unit 219 (step SB12).

In step SC7, the playback unit 219 or the text display unit 220 acquires the text display file and the video and voice recording file from the memory 230 or the conference server 1 (step SC7).

Next, the playback unit 219 plays back the video recording and the voice recording of the online conference based on the video and voice recording file acquired in step SC7 (step SC8). Further, the text display unit 220 displays text spoken in the online conference, based on the text display file for displaying text selected in step SB5 out of the text display files acquired in step SC7 (step SC8).

3. Other Embodiments

The above-described embodiments are merely examples of one aspect of the present invention, and can be arbitrarily modified and applicable.

The display device 20 provided in the vehicle 3 has been described as an "information processing device" in the above-described embodiments, but the "information processing device" may be a smartphone or a PC such as a tablet terminal in other embodiments. In this case, the conference application 231 is installed in the "information processing device. Further, in this case, when the information processing device is brought into the vehicle 3, the "information processing device may communicate with the vehicle 3 to acquire the state of the vehicle 3 and the speed of the vehicle 3.

In other embodiments, when the "information processing device" is a smartphone or a PC such as a tablet terminal, the first conversion unit 213 and the second conversion unit 214 are not functional units of the processor of the "information processing device", but may be functional units of the processor of the conference server 1 or a conversion-dedicated server device.

In the above-described embodiments, the displayed text automatically changes depending on the state of the vehicle 3 and the speed of the vehicle 3. In other embodiments, a viewer may select text to be displayed before the start of playback of the video recording and the voice recording or during the playback of the video recording and the voice recording.

In the above-described embodiments, whether the vehicle 3 is driving is determined depending on the speed of the vehicle 3. In other embodiments, whether the vehicle 3 is driving may be determined depending on whether the vehicle 3 is parking. In other embodiments, the state acquisition unit 212 acquires from the shift position sensor 21 whether the vehicle 3 is parking. Then, in step SB3, the text display unit 220 makes a negative determination when the state of the vehicle 3 acquired by the state acquisition unit 212 is parking, and makes an affirmative determination when the state of the vehicle 3 acquired by the state acquisition unit 212 is not parking.

In other embodiments, the playback unit 219 and the text display unit 220 out of the functional units of the processor 210 may function as functional units of a processor of a device different from the display device 20. An example of the device different from the display device 20 includes a smartphone or a PC such as a tablet terminal, and communicates with at least one of the display device 20 and the conference server 1.

The display device 20 includes the touch panel 13 in the above-described embodiments, but the display device 20 may not include the touch panel 13 in other embodiments. In other embodiments, the "display unit" is not limited to the touch panel 13, and may be, for example, a display not including a touch sensor.

In the above-described embodiments, when the vehicle 3 is not driving, text to be displayed along with the playback of the playback unit 219 can be selected. In other embodiments, when the vehicle 3 is not driving, text converted by the first conversion unit 213 may be automatically selected as text to be displayed along with the playback of the playback unit 219.

In the above-described embodiments, the vehicle 3 includes the driving support device 19. In other embodiments, the vehicle 3 may include an autonomous driving device instead of or together with the driving support device 19. The autonomous driving device is a device for performing an autonomous driving function to automatically drive the vehicle 3. The autonomous driving device is connected to the display device 20, outputs information indicating that the execution of the autonomous driving function is turned on, to the display device 20, when the execution of the autonomous driving function is turned on, and outputs information indicating that the execution of the autonomous driving function is turned off, to the display device 20, when the execution of the autonomous driving function is turned off. In other embodiments, the determination unit 215 determines, based on the information output from the autonomous driving device, whether the execution of the autonomous driving function of the vehicle 3 is turned on or off. Then, in other embodiments, when the determination unit 215 determines that the execution of the autonomous driving function is turned on, the process proceeds to step SB4 from step SB1, and the processor 210 executes next processes including step SB4, and when the determination unit 215 determines that the execution of the autonomous driving function is turned off, the process proceeds to step SB3 from step SB1, and the processor 210 executes next processes including step SB3. In other embodiments, when the determination unit 215 determines that the execution of the autonomous driving function is turned on, the process proceeds to step SB4 from step SB1, and the processor 210 executes next processes including step SB4, and when the determination unit 215 determines that the execution of the autonomous driving function is turned off, the process proceeds to step SC1 from step SB1, and the processor 210 executes next processes including step SC1.

In the above-described embodiments, the "program" is exemplified as an application program, but the "program" may be configured as a part of the program of an OS (Operating System) of the display device 20.

In the above-described embodiments, the configuration is provided in which the voice spoken in Japanese is converted into text, but the language of the spoken voice to be converted by the first conversion unit 213 and the second conversion unit 214 is not limited to Japanese, and may be another language such as English.

In other embodiments, text converted from the spoken voice may be translated into a predetermined language during the online conference, and the translation of text may be displayed along with the text. In other embodiments, text and the translation of the text may be displayed along with the playback of the video recording and the voice recording of the online conference. In other embodiments, furthermore, it may selectively or automatically display, during the playback of the video recording and the voice recording of the online conference, the translation of text translated during the online conference or the translation of text translated after the online conference, taking a longer period of time compared to the translation during the online conference.

The processor 210 may be configured by a single processor or may be configured by a plurality of processors. The processor 210 may be hardware programmed to realize the corresponding functional units. In other words, the processor 210 may be configured by, for example, an application specific integrated circuit (ASIC) or a field programmable gate array (FPGA).

Further, the configuration of the vehicle 3 shown in FIG. 2 is an example, and a specific implementation form is not particularly limited. In other words, hardware individually corresponding to each of the components may not necessarily be implemented, but it is apparently possible to realize functions of each of the components by executing programs by one processor. Further, a part of the functions realized by software in the aforementioned embodiments may be hardware, or a part of the functions realized by hardware may be realized by software. Additionally, a specific detail configuration of each of the components of the vehicle 3 can be arbitrarily changed.

The operation step units shown in FIGS. 7 to 9 are divided depending on main process contents in order to facilitate understanding of the operation, and the present invention is not limited by a division method or a name of the process units. The operation step units may be divided into more step units depending on the process contents. In addition, one step unit may be divided so as to include more processes. The order of the steps may be changed as appropriate without departing from the spirit and scope of the present invention.

Further, in the case of realizing a control method of the display device 20 described above using the processor 210, it is also possible to implement the program to be executed by the processor 210 in the form of a recording medium or a transmission medium which transmits the program. In other words, the conference application 231 can be realized in the state of recording the conference application 231 in a portable information recording medium. Examples of the information recording medium are a magnetic recording medium such as a hard disk, an optical recording medium such as a CD and a semiconductor storage device such as a USB (Universal Serial Bus) memory and an SSD (Solid State Drive), and the other recording medium can be also used.

4. Configurations Supported by Embodiments Described Above

The above-described embodiments support the following configurations.

(Configuration 1) A conference system including: a first conversion unit configured to, during an online conference in which an occupant of a vehicle participates, convert a spoken voice in the online conference into text; a second conversion unit configured to convert the spoken voice into text with higher accuracy compared to the first conversion unit after an end of the online conference; a recording unit configured to record a video of the online conference and record the spoken voice; a playback unit configured to play back the video of the online conference recorded by the recording unit and the spoken voice recorded by the recording unit; and a text display unit configured to display text converted by the first conversion unit or text converted by the second conversion unit, accompanying the playback of the playback unit.

According to the conference system of Configuration 1, it is possible to play back the video recording and the voice recording of the online conference and to display text converted during the online conference or text in which the spoken voice is converted with higher accuracy compared to the conversion during the online conference. Therefore, it is possible to, during the playback of the video recording and the voice recording of the online conference, display the voice spoken in the online conference in the form of text suitable for viewer's wishes and viewing conditions.

(Configuration 2) In the conference system according to Configuration 1, the playback unit performs playback using a playback instrument in the vehicle, and the text display unit displays text converted by the first conversion unit or text converted by the second conversion unit using a display unit in the vehicle, depending on a state of the vehicle.

According to the conference system of Configuration 2, when a viewer watches and listen to the video recording and the voice recording of the online conference in the vehicle, the state of the vehicle can be considered for the kind of text displayed along with the playback of the video recording and the voice recording of the online conference. For this reason, when the viewer watches and listen to the video recording and the voice recording of the online conference in the vehicle, it is possible to display text suitable for the state of the vehicle. Therefore, it is possible to prevent the driver from being distracted by text to be displayed during the playback of the video recording and the voice recording of the online conference, that is, from looking aside while driving.

(Configuration 3) In the conference system according to Configuration 2, the text display unit displays text converted by the second conversion unit when the vehicle is in a driving state.

According to the conference system of Configuration 3, it is possible to, during the playback of the video recording and the voice recording of the online conference, display text converted during the online conference or text in which the spoken voice is converted with higher accuracy compared to the first conversion unit when the vehicle is in a driving state. For this reason, it is possible to prevent the driver of the vehicle from feeling uncomfortable with the displayed text and being distracted by the displayed text. Therefore, it is possible to prevent the viewer from looking aside while driving when the viewer watches and listen to the recording and the voice recording of the online conference in the vehicle.

(Configuration 4) In the conference system according to any one of Configurations 1 to 3, the playback unit performs playback using a playback instrument in the vehicle, and when execution of a driving support function of the vehicle is turned on, or execution of an autonomous driving function of the vehicle is turned on, the text display unit is configured to: accept a selection operation as to whether text to be displayed accompanying the playback of the playback unit is text converted by the first conversion unit or text converted by the second conversion unit; and display text selected by the selection operation using a display unit in the vehicle, accompanying the playback of the playback unit.

According to the conference system of Configuration 4, when the execution of the driving support function or the autonomous driving function of the vehicle is turned on, it is possible to display text selected by the viewer during the playback of the video recording and the voice recording of the online conference. Therefore, when the execution of the driving support function or the autonomous driving function of the vehicle is turned on, it is possible to display the voice spoken in the online conference in the form of text that meets viewer's wishes.

(Configuration 5) In the conference system according to any one of Configurations 1 to 4, the playback unit performs playback using a playback instrument in the vehicle, and the text display unit displays text converted by the second conversion unit using a display unit in the vehicle when a speed of the vehicle exceeds a predetermined value.

According to the conference system of Configuration 5, when the viewer watches and listen to the video recording and the voice recording of the online conference, it is possible to display text converted during the online conference or text in which the spoken voice is converted with higher accuracy compared to the first conversion unit in a case where the speed of the vehicle exceeds a predetermined value. For this reason, when the speed of the vehicle exceeds the predetermined value, it is possible to prevent the driver from feeling uncomfortable with the displayed text and being distracted by the displayed text. Therefore, it is possible to prevent the viewer from looking aside while driving when the viewer watches and listen to the recording and the voice recording of the online conference in the vehicle.

(Configuration 6) In the conference system according to Configuration 5, the text display unit displays text converted by the first conversion unit when the speed of the vehicle is the predetermined value or smaller.

According to the conference system of Configuration 6, when the viewer watches and listen to the video recording and the voice recording of the online conference in the vehicle, it is possible to display the voice spoken in the online conference in the form of text displayed during the online conference in a case where the speed of the vehicle is a predetermined value or smaller. In a case where the vehicle is not moved or in a circumstance where the vehicle can be stopped quickly, there is a low possibility that the driving immediately leads to dangerous driving even if the driver looking aside while driving. For this reason, when the viewer watches and listen to the video recording and the voice recording of the online conference in the vehicle, the viewer can watch and listen to the video recording and the voice recording that match the video of the online conference actually took place, in a case where the vehicle is not moved or in a circumstance where the vehicle can be stopped quickly. Therefore, when the viewer watches and listen to the video recording and the voice recording of the online conference in the vehicle, it is possible to display the voice spoken in the online conference with text in a manner that the viewer may request, in a case where the vehicle is not moved or in a circumstance where the vehicle can be stopped quickly.

(Configuration 7) An information processing device including: a first conversion unit configured to, during an online conference in which an occupant of a vehicle participates, convert a spoken voice in the online conference into text; a second conversion unit configured to convert the spoken voice into text with higher accuracy compared to the first conversion unit after an end of the online conference; a recording unit configured to record a video of the online conference and record the spoken voice; a playback unit configured to play back the video of the online conference recorded by the recording unit and the spoken voice recorded by the recording unit; and a text display unit configured to display text converted by the first conversion unit or text converted by the second conversion unit, accompanying the playback of the playback unit.

According to the information processing device of Configuration 7, the same effect as in the conference system of Configuration 1 is achieved.

(Configuration 8) A non-transitory computer readable recording medium recording a program causing a processor of an information processing device to function as: a first conversion unit configured to, during an online conference in which an occupant of a vehicle participates, convert a spoken voice in the online conference into text; a second conversion unit configured to convert the spoken voice into text with higher accuracy compared to the first conversion unit after an end of the online conference; a recording unit configured to record a video of the online conference and record the spoken voice; a playback unit configured to play back the video of the online conference recorded by the recording unit and the spoken voice recorded by the recording unit; and a text display unit configured to display text converted by the first conversion unit or text converted by the second conversion unit, accompanying the playback of the playback unit.

According to the recording medium of Configuration 8, the same effect as in the conference system of Configuration 1 is achieved.

REFERENCE SIGNS LIST 1 conference server
2, 2-1, 2-2 terminal device
3 vehicle
13 touch panel (playback instrument, display unit)
14 speaker (playback instrument)
20 display device (information processing device)
210 processor
211 communication control unit
212 state acquisition unit
213 first conversion unit 214 second conversion unit
215 determination unit
216 conference execution unit
217 recording unit
218 file creation unit
219 playback unit
220 text display unit
230 memory
231 conference application (program)
240 operation switch group
250 interface unit
1000 conference system
P conference participant
P1 terminal user
P2 terminal user
P3 occupant

What is claimed is:

1. A conference system comprising a processor that functions as:
   a first conversion unit configured to, during an online conference in which an occupant of a vehicle participates, convert a spoken voice in the online conference into text;
   a second conversion unit configured to convert the spoken voice into text with higher accuracy compared to the first conversion unit after an end of the online conference;
   a recording unit configured to record a video of the online conference and record the spoken voice;
   a playback unit configured to play back the video of the online conference recorded by the recording unit and the spoken voice recorded by the recording unit; and
   a text display unit configured to display text converted by the first conversion unit or text converted by the second conversion unit, accompanying the playback of the playback unit, wherein
   the playback unit performs playback using a playback instrument in the vehicle, and
   the text display unit displays text converted by the first conversion unit or text converted by the second conversion unit using a display unit in the vehicle, depending on a state of the vehicle.

2. The conference system according to claim 1, wherein the text display unit displays text converted by the second conversion unit when the vehicle is in a driving state.

3. The conference system according to claim 1, wherein when execution of a driving support function of the vehicle is turned on, or execution of an autonomous driving function of the vehicle is turned on, the text display unit is configured to:
   accept a selection operation as to whether text to be displayed accompanying the playback of the playback unit is text converted by the first conversion unit or text converted by the second conversion unit; and
   display text selected by the selection operation using the display in the vehicle, accompanying the playback of the playback unit.

4. The conference system according to claim 1, wherein the text display unit displays text converted by the second conversion unit using the display in the vehicle when a speed of the vehicle exceeds a predetermined value.

5. The conference system according to claim 4, wherein the text display unit displays text converted by the first conversion unit when the speed of the vehicle is the predetermined value or smaller.

6. An information processing device comprising a processor that functions as:
   a first conversion unit configured to, during an online conference in which an occupant of a vehicle participates, convert a spoken voice in the online conference into text;
   a second conversion unit configured to convert the spoken voice into text with higher accuracy compared to the first conversion unit after an end of the online conference;
   a recording unit configured to record a video of the online conference and record the spoken voice;
   a playback unit configured to play back the video of the online conference recorded by the recording unit and the spoken voice recorded by the recording unit; and
   a text display unit configured to display text converted by the first conversion unit or text converted by the second conversion unit, accompanying the playback of the playback unit, wherein
   the playback unit performs playback using a playback instrument in the vehicle, and
   the text display unit displays text converted by the first conversion unit or text converted by the second conversion unit using a display in the vehicle, depending on a state of the vehicle.

7. A non-transitory computer readable recording medium recording a program causing a processor of an information processing device to function as:
   a first conversion unit configured to, during an online conference in which an occupant of a vehicle participates, convert a spoken voice in the online conference into text;
   a second conversion unit configured to convert the spoken voice into text with higher accuracy compared to the first conversion unit after an end of the online conference;
   a recording unit configured to record a video of the online conference and record the spoken voice;
   a playback unit configured to play back the video of the online conference recorded by the recording unit and the spoken voice recorded by the recording unit; and
   a text display unit configured to display text converted by the first conversion unit or text converted by the second conversion unit, accompanying the playback of the playback unit, wherein
   the playback unit performs playback using a playback instrument in the vehicle, and
   the text display unit displays text converted by the first conversion unit or text converted by the second conversion unit using a display in the vehicle, depending on a state of the vehicle.

* * * * *